United States Patent
Choi et al.

(10) Patent No.: US 10,468,030 B2
(45) Date of Patent: Nov. 5, 2019

(54) SPEECH RECOGNITION METHOD AND APPARATUS

(71) Applicant: SAMSUNG ELECTRONICS CO., LTD., Suwon-si (KR)

(72) Inventors: Junhwi Choi, Seongnam-si (KR); YoungSang Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 15/597,668

(22) Filed: May 17, 2017

(65) Prior Publication Data
US 2018/0174589 A1 Jun. 21, 2018

(30) Foreign Application Priority Data
Dec. 19, 2016 (KR) .................. 10-2016-0173746

(51) Int. Cl.
| | | |
|---|---|---|
| *G10L 15/00* | (2013.01) | |
| *G10L 15/32* | (2013.01) | |
| *G10L 15/183* | (2013.01) | |
| *G10L 15/02* | (2006.01) | |
| *G10L 15/16* | (2006.01) | |
| *G10L 25/30* | (2013.01) | |

(52) U.S. Cl.
CPC .............. *G10L 15/32* (2013.01); *G10L 15/02* (2013.01); *G10L 15/183* (2013.01); *G10L 15/16* (2013.01); *G10L 25/30* (2013.01)

(58) Field of Classification Search
CPC combination set(s) only.
See application file for complete search history.

(56) References Cited

U.S. PATENT DOCUMENTS

| | | | |
|---|---|---|---|
| 8,965,763 B1* | 2/2015 | Chelba | G10L 15/063 704/231 |
| 2012/0245934 A1* | 9/2012 | Talwar | G10L 15/22 704/235 |

FOREIGN PATENT DOCUMENTS

| | | |
|---|---|---|
| JP | 5-188998 A | 7/1993 |
| KR | 10-1394253 B1 | 5/2014 |

(Continued)

OTHER PUBLICATIONS

Bahdanau, Dzmitry, et al. "End-to-end attention-based large vocabulary speech recognition."Acoustics, Speech and Signal Processing (ICASSP), 2016 IEEE International Conference on. IEEE, 2016.

(Continued)

*Primary Examiner* — Vu B Hang
(74) *Attorney, Agent, or Firm* — NSIP Law

(57) ABSTRACT

Disclosed is a speech recognition method and apparatus, the method including two recognition processes, a first recognition process being performed using an acoustic model and a language model and a second recognition process being performed without distinguishing between the acoustic model and the language model in response to an accuracy of a result of the first recognition process not meeting a threshold. The apparatus including a processor configured to acquire a first text from a speech sequence using an acoustic model and a language model, determine whether an accuracy of the first text meets a threshold, and acquire a second text from the first text based on a parameter generated in acquiring the first text, in response to the accuracy of the first text being below the threshold.

20 Claims, 6 Drawing Sheets

(56) References Cited

FOREIGN PATENT DOCUMENTS

| KR | 10-2016-0066441 A | 6/2016 |
| WO | WO 2015/102127 A1 | 7/2015 |
| WO | WO 2016/117793 A1 | 7/2016 |

OTHER PUBLICATIONS

Hinton, Geoffrey, et al. "Deep neural networks for acoustic modeling in speech recognition: The shared views of four research groups." IEEE Signal Processing Magazine 29.6 (2012): 82-97.

\* cited by examiner

SPEECH RECOGNITION METHOD AND APPARATUS

CROSS-REFERENCE TO RELATED APPLICATION(S)

This application claims the benefit under 35 USC § 119(a) of Korean Patent Application No. 10-2016-0173746 filed on Dec. 19, 2016, in the Korean Intellectual Property Office, the entire disclosure of which is incorporated herein by reference for all purposes.

BACKGROUND

1. Field

The following description relates to recognizing a speech from a speech sequence and acquiring a text.

2. Description of Related Art

A speech is the most conveniently used by a human to deliver information. The information delivered by the speech is used in a data exchange between people and can also be used for an operation of a machine or a device. Accordingly, there is a desire for an interface capable of speech recognition to be used as an interface for operating the machine or device more conveniently.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method for speech recognition, the method including acquiring a first text from a speech sequence using an acoustic model and a language model, determining whether an accuracy of the first text meets a threshold, and acquiring a second text from the first text based on a parameter generated in acquiring the first text, in response to the accuracy of the first text being below the threshold.

The method may include outputting the first text in response to an accuracy of the first text meeting the threshold.

The parameter may include a feature vector extracted from the speech sequence, a hidden state of the acoustic model corresponding to the speech sequence, a hidden state of the language model corresponding to the speech sequence, or the speech sequence.

The determining may include calculating the accuracy of the first text based on the parameter, and comparing the accuracy to the threshold.

The acquiring of the second text may include encoding the first text based on the parameter to generate a context, and determining the second text by decoding the context.

The determining of the second text may include decoding the context using a neural network.

The acquiring of the first text may include acquiring a phone sequence from the speech sequence using the acoustic model, acquiring a probability sequence from the speech sequence using the language model, and generating the first text based on the probability sequence.

The acquiring of the first text further may include extracting a feature vector from the speech sequence, and the acquiring of the phone sequence may include acquiring a phone sequence from the feature vector using the acoustic model.

The acquiring of the phone sequence may include acquiring the phone sequence based on statistical information associated with states of speech sections including the speech sequence and statistical information associated with transitions between the states of the speech sections.

The acoustic model may include a neural network on which a prior learning is performed based on learning data.

The hidden state of the acoustic model may include information on the states of the speech sections including the speech sequence or on transitions between the states of the speech sections.

The hidden state of the acoustic model may include a parameter of a hidden layer of a neural network.

The speech sequence may be divided into speech sections using Gaussian probability density functions.

In another general aspect, there is provided a method for speech recognition, the method including acquiring a first text from a speech sequence using an acoustic model and a language model, and acquiring a second text from the first text based on a parameter generated in acquiring the first text.

The parameter may include a feature vector extracted from the speech sequence, a hidden state of the acoustic model corresponding to the speech sequence, a hidden state of the language model corresponding to the speech sequence, or the speech sequence.

In another general aspect, there is provided a speech recognition apparatus including a processor configured to acquire a first text from a speech sequence using an acoustic model and a language model, determine whether an accuracy of the first text meets a threshold, and acquire a second text from the first text based on a parameter generated in acquiring the first text, in response to the accuracy of the first text being below the threshold.

In another general aspect, there is provided a speech recognition apparatus including a sensor configured to receive a speech sequence, a processor configured to extract a feature vector from the speech sequence, acquire a phone sequence and a hidden value of an acoustic model from the feature vector using the acoustic model, generate a probability sequence and a hidden value of a language model from the phone sequence using the language model, generate a first text based on the probability sequence, output the first text, in response to an accuracy of the first text being greater than or equal to a threshold, encode the first text to generate a context, in response to an accuracy of the first text being less than the threshold, and decoding the context to output a second text using a neural network.

The processor may be configured to encode the first text based on any one or any combination of the feature vector, the phone sequence, the hidden value of the acoustic model, the probability sequence, the hidden value of the language model, and the accuracy.

The processor may be configured to extract the feature vector based on dividing the speech sequence at intervals of frames to acquire information per frequency band from each of the frame, and digitizing the information per frequency band for each of the frame to acquire the feature vector.

The speech recognition may include a memory configured to store instructions to be executed by the processor, to store the first text and the second text, to store parameter generated in acquiring the first text and the second text, and to store information on the acoustic model, the language model, and the neural network.

Other features and aspects will be apparent from the following detailed description, the drawings, and the claims.

Figure 1:
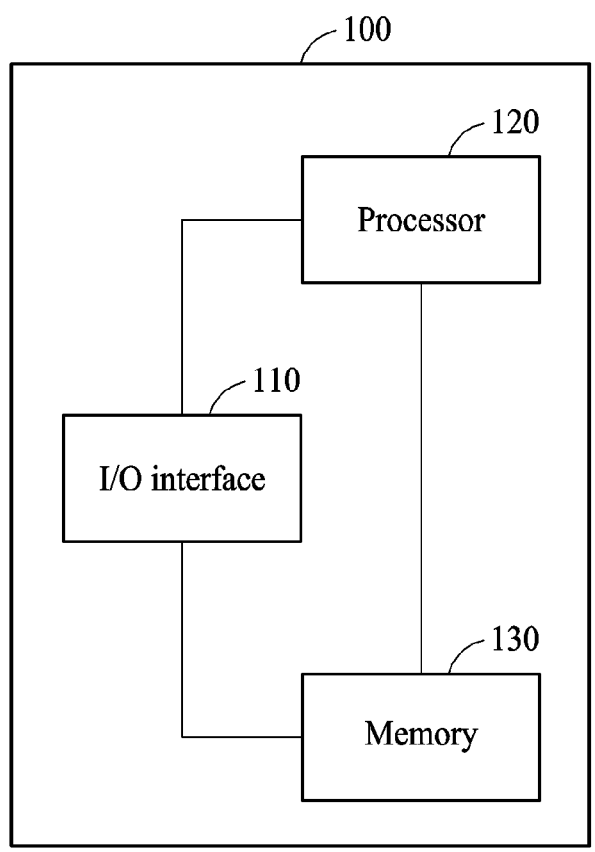
FIG. 1 illustrates an example of a speech recognition apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Various alterations and modifications may be made to the examples. Here, the examples are not construed as limited to the disclosure and should be understood to include all changes, equivalents, and replacements within the idea and the technical scope of the disclosure.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component.

The terminology used herein is for the purpose of describing particular examples only, and is not to be used to limit the disclosure. As used herein, the terms "a," "an," and "the" are intended to include the plural forms as well, unless the context clearly indicates otherwise.

A speech recognition method is applicable to an electronic product that requires a communication with a user by speech such as, for example, a smartphone, a wearable device, and a vehicular user interface, or a software product such as a translation service and a search service. In an example, the speech recognition includes a speech-to-text (STT).

FIG. 1 illustrates an example of a speech recognition apparatus.

A speech recognition apparatus 100 performs speech recognition. The speech recognition apparatus 100 recognizes a speech signal input to the speech recognition apparatus 100 and outputs a result of speech recognition. The speech recognition may be a process of converting language information included in a speech signal into text information. The speech recognition apparatus 100 analyzes the input speech signal and estimates text information indicated by language information included in the speech signal. In an example, the speech signal is in a form of speech sequence.

A speech recognition apparatus may be embedded in or configured to interact with devices such as, for example, a mobile phone, an intelligent agent, a cellular phone, a smartphone, a portable personal computer (PC), a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, a set-top box, a home appliance, various Internet of Things (loT) devices that are controlled through a network, or any other mobile or stationary device capable of wireless or network communication. The speech recognition apparatus may also be embedded in or configured to interact with devices such as, for example, a smart appliance, an intelligent vehicle, a smart building system, a smart home system, a smart office system, or a smart electronic security system. Also, the speech recognition apparatus may be included in or configured to interact with a wearable device, which is any device that is mounted on the body of the user. In an example, a wearable device is designed to be mountable directly on the body of the user, such as a ring, a watch, a pair of glasses, glasses-type device, a bracelet, an ankle bracelet, a belt, a necklace, an earring, a headband, a helmet, or a device embedded in clothing.

The speech recognition apparatus 100 performs the speech recognition through two processes. The speech recognition apparatus 100 performs a first recognition process using an acoustic model and a language model and determines an accuracy of a result of the first recognition process. When the accuracy is relative low, the speech recognition apparatus 100 performs a second recognition process without distinguishing between the acoustic model and the language model.

The first recognition process may indicate an operation of acquiring a first text from a speech sequence using the acoustic model and the language model. The second recognition process may indicate an operation of acquiring a second text from the first text based on a parameter generated in acquiring the first text.

In an example, the speech recognition apparatus 100 includes an input and output interface 110, a processor 120, and a memory 130. Hereinafter, the input and output interface 110 is also referred to as the I/O interface 110.

The I/O interface 110 receives the speech sequence. The I/O interface 110 includes, for example, a microphone. When speech recognition is performed by the processor 120, the I/O interface 110 outputs a text corresponding to the recognized speech. In an example, the I/O interface 110 includes a display.

In an example, the I/O interface 110 receives a multimedia sequence including an image and the speech. By using the image, the processor 120 more accurately recognizes the speech from the multimedia sequence. For example, the speech may be more accurately recognized based on a shape of a mouth of a person included in the image.

The memory 130 receives the speech sequence or the multimedia sequence transmitted from the I/O interface 110. The memory 130 stores instructions to be executed by the processor 120. The memory 130 stores the result of the first recognition process or the second recognition process. The memory 130 stores the parameter generated in the first recognition process. The memory 130 includes information on the acoustic model or the language model used in the first recognition process. The memory 130 includes information on a neural network used in the second recognition process.

The processor 120 receives the speech sequence or the multimedia sequence from the I/O interface 110 and performs the speech recognition. The processor 120 performs the speech recognition through two processes. The processor 120 performs the first recognition process and determines an accuracy of a result of the first recognition process. When the accuracy is relative low, the processor 120 performs the second recognition process.

In an example, the first recognition process is a speech recognition process that is performed using an acoustic model and a language model. The acoustic model is generated based on a sound in units of phones or sub-phones. In an example, the acoustic model is trained based on learning data in units of phones or sub-phones. The language model is generated based on linguistic relationships between syllables or words corresponding to a recognition vocabulary. For example, the language model is trained to receive a phone sequence as learning data and generate a probability sequence corresponding to a sequence of accurate ordinal syllables or words.

The first recognition process is includes generating the phone sequence using the acoustic model and generating a probability sequence from the phone sequence using the language model. Thus, a speech included in a general speech sequence may be recognized with increased speed and accuracy. When the speech sequence contains a lot of noise, an accuracy of the acoustic model may decrease. Also, an accuracy of the language model may decrease with respect to a sequence of syllables or words that may not be expressed by the language model.

In an example, the second recognition process is a speech recognition process that is performed without distinguishing between the acoustic model and the language model. The second recognition process does not use the acoustic model and the language model. The second recognition process acquires the probability sequence directly from the speech sequence instead of generating the phone sequence. In an example, the second recognition process employs a neural network. The neural network is trained by receiving an overall speech sequence as learning data instead of the learning data in units of phones or sub-phones and thus, may be more robust to the noise. Also, the speech sequence recognized in the second recognition process is not limited by the language model. In the second recognition process, a relatively high accuracy may be secured with respect to the sequence of syllables or words that may not be expressed by the language model.

The speech recognition apparatus 100 performs the first recognition process, determines an accuracy of a result of the first recognition process, and then determines whether to perform the second recognition process, thereby applying advantages of the first recognition process and the second recognition process. When the accuracy is relatively high, the speech recognition apparatus 100 performs only the first recognition process and thus, a speed of the speech recognition is increased. When the accuracy of the first recognition process is relative low, the speech recognition apparatus 100 performs the second recognition process in addition to the first recognition process and thus, an accuracy of the speech recognition is increased.

In an example, the degree of accuracy needed by the speech recognition apparatus 100 is adjusted. In response to the degree of accuracy being adjusted, the speech recognition apparatus 100 provides a desired level of speed and accuracy to a user.

Figure 2:
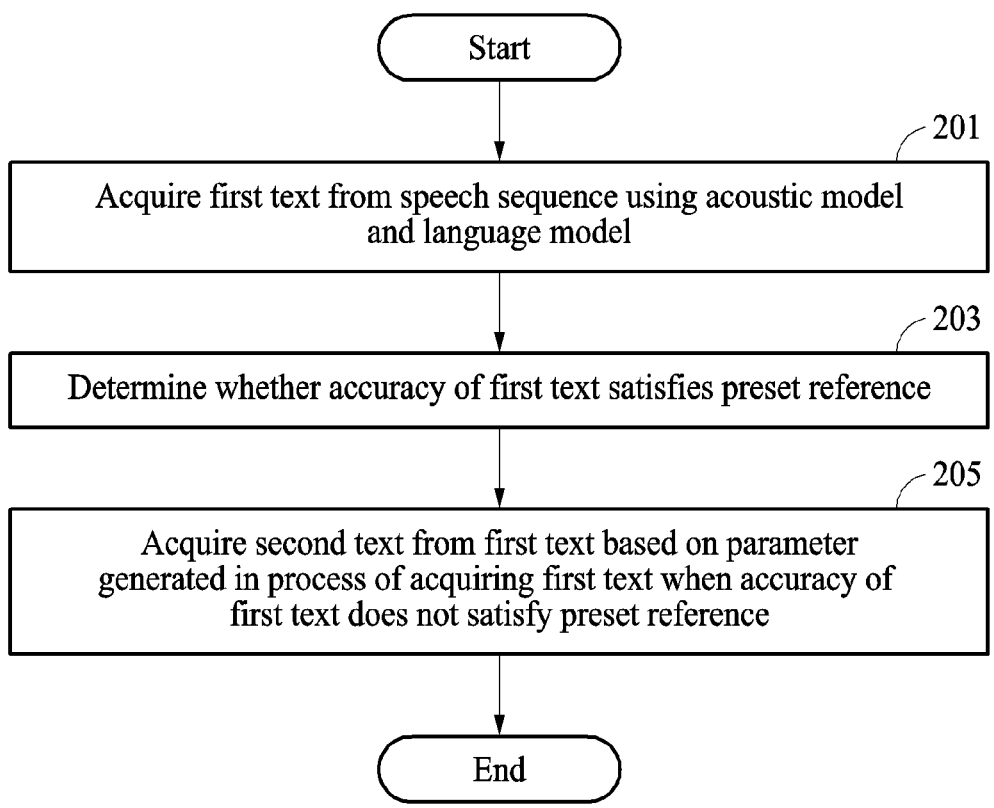
FIG. 2 illustrates an example of a speech recognition method.

FIG. 2 illustrates an example of a speech recognition method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the above descriptions of FIG. 1 is also applicable to FIG. 2, and are incorporated herein by reference. Thus, the above description may not be repeated here.

Referring to FIG. 2, in operation 201, the speech recognition apparatus 100 acquires a first text from a speech sequence using an acoustic model and a language model. In an example, 201 indicates a first recognition process.

In 201, to acquire the first text, the speech recognition apparatus 100 acquires a phone sequence from the speech sequence using the acoustic model. The speech recognition apparatus 100 acquires a probability sequence from the phone sequence using the language model. The speech recognition apparatus 100 generates the first text from the probability sequence.

In an example, the speech recognition apparatus 100 extracts a feature vector from the speech sequence. In an example, the speech recognition apparatus 100 acquires the phone sequence from the feature vector using the acoustic model. The speech recognition apparatus 100 acquires the phone sequence based on statistical information on the states of a plurality of speech sections that comprise the speech sequence and the statistical information on transitions between the states of the plurality of speech sections. The acoustic model includes models such as, for example, a hidden Markov model (HMM). In an example, a hidden state of the acoustic model includes information on states of a plurality of sequence sections or on transitions between the states of the plurality of speech sections.

The speech recognition apparatus 100 divides the speech sequence into the plurality of speech sections using a plurality of Gaussian probability density functions. In an example, the speech recognition apparatus 100 uses a Gaussian mixture model (GMM).

The acoustic model includes a neural network on which a prior learning is performed based on learning data. In an example, the acoustic model includes a deep neural network (DNN). In an example, a hidden state of the acoustic model includes a parameter of a hidden layer of the neural network.

When the speech sequence includes a first speech section and a second speech section, the speech recognition apparatus 100 inputs a result of the neural network for the first speech section into the neural network together with second speech section to acquire the phone sequence. The acoustic model includes, for example, a recurrent neural network (RNN).

The speech recognition apparatus 100 acquires the probability sequence from the phone sequence using the language model. The language model includes information on characters that may be linked after each character of a language based on a sentence structure. The speech recognition apparatus 100 selects a character corresponding to each pronunciation of the phone sequence, and predict a character that may be linked after the selected character. The speech recognition apparatus 100 generates the probability sequence including the probability of the selected character based on a probability of a character following the selected character corresponding to each pronunciation.

The speech recognition apparatus 100 generates a probability sequence based on probabilities between phone sections constituting the phone sequence. The phone sequence is processed using a window having n nodes. In an example, a single node corresponds to a single phone section. While sliding over the window having n nodes, the speech recognition apparatus 100 analyzes the phone sequence and acquires the probability sequence. The language model includes, for example, an n-gram model.

Similar to the acoustic model, the language model also includes a neural network on which a prior learning is performed based on learning data. The language model includes, for example, a deep neural network. In this example, a hidden state of the language model includes a result value or a parameter of a hidden layer of the neural network.

Similar to the acoustic model, the language model also includes a recurrent neural network (RNN). When the phone sequence includes a first phone section and a second phone section, the speech recognition apparatus 100 acquires a probability sequence by inputting a result of the neural network for the first phone section into the neural network together with the second phone section to the neural network.

Generating the first text from the probability sequence may be referred to as a decoding operation. In the decoding operation, the speech recognition apparatus 100 selects an optimal probability sequence and acquires the first text from the probability sequence based on a relationship between a probability and a character included in the language model.

In 203, the speech recognition apparatus 100 determines whether an accuracy of the first text satisfies a threshold. The speech recognition apparatus 100 calculates the accuracy of the first text. The speech recognition apparatus 100 compares the accuracy to the threshold. The speech recognition apparatus 100 calculates the accuracy of the first text based on a parameter generated acquiring the first text.

The accuracy is calculated based on, for example, a preset function. The speech recognition apparatus 100 expresses the accuracy of the first text as a score based on the feature vector extracted from the speech sequence, the hidden state of the acoustic model corresponding to the speech sequence, the hidden state of the language model corresponding to the speech sequence, or the speech sequence.

In an example, the threshold is represented as a score. The threshold is set based on a speed and an accuracy required for a speech recognition service in consideration of an appropriate quality.

The parameter includes the feature vector extracted from the speech sequence, the hidden state of the acoustic model corresponding to the speech sequence, the hidden state of the language model corresponding to the speech sequence, or the speech sequence.

In 205, when the accuracy of the first text does not satisfy the threshold, the speech recognition apparatus 100 acquires a second text from the first text based on a parameter generated in acquiring the first text. Operation 205 indicates a second recognition process.

The speech recognition apparatus 100 performs an encoding operation and a decoding operation. In the encoding operation, the speech recognition apparatus 100 encodes the first text based on the parameter generated in a process of acquiring the first text and generates a context to acquire a second text. In the decoding operation, the speech recognition apparatus 100 decodes the context and determines the second text.

The speech recognition apparatus 100 uses a neural network to determine the second text from the context. In an example, the neural network is a deep neural network on which a prior learning is performed based on learning data. In an example, the neural network is a recurrent neural network that determines the second text by inputting a result of the neural network with respect to a previous input and the previous input to the neural network.

In an example, the speech recognition apparatus 100 performs the second recognition process after performing the first recognition process, instead of determining the accuracy. The speech recognition apparatus 100 acquires the first text from the speech sequence using the acoustic model and the language model, and then acquires the second text from the first text based on the parameter generated in acquiring the first text. Thus, the speech recognition apparatus increases the accuracy of an input that may be expressed using the acoustic model or the language model and also secures a relatively high accuracy with respect to an input that may not be expressed using the acoustic model or the language model.

Figure 3:
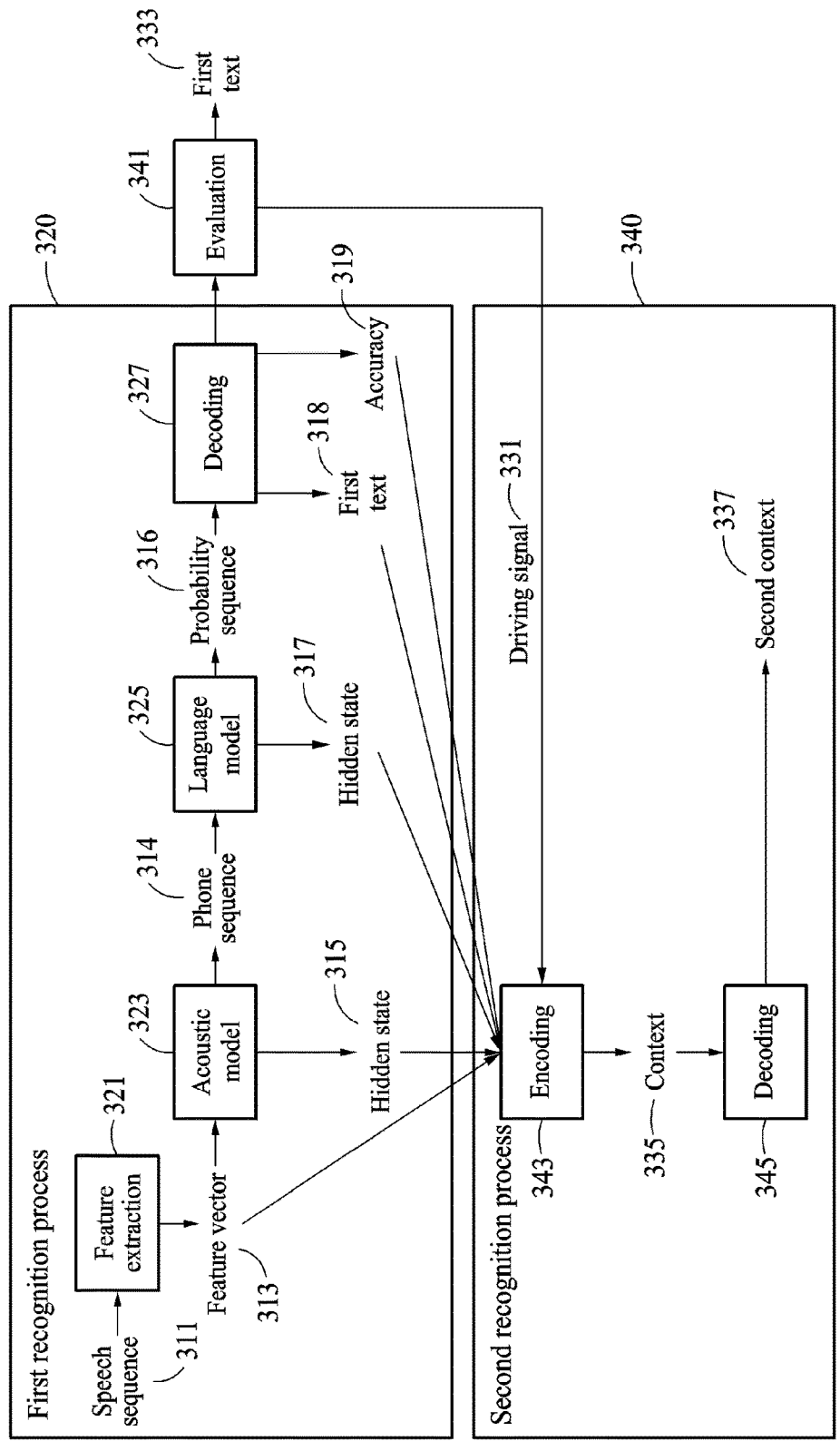
FIG. 3 illustrates an example of recognizing a speech.

FIG. 3 illustrates an example of recognizing a speech. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the above descriptions of FIGS. 1-2 is also applicable to FIG. 3, and are incorporated herein by reference. Thus, the above description may not be repeated here.

Referring to FIG. 3, the speech recognition apparatus 100 performs speech recognition through two processes, for example, first recognition process 310 and second recognition process 320. The speech recognition apparatus 100 performs recognition operation 320 to acquire a first text 318, and an accuracy 319 of the first text 318.

The speech recognition apparatus 100 performs a feature extraction on a speech sequence 311 received from an I/O interface in operation 321. In operation 321, the speech recognition apparatus 100 extracts a feature vector 313 from the speech sequence 311.

The speech recognition apparatus 100 divides the speech sequence 311 at intervals of frames and acquires information per frequency band from each of the frame. The information per frequency band includes information such as, for example, an energy distribution per frequency band. The information per frequency band for each of the frame is digitized and the feature vector 313 is acquired from the digitized information.

The speech recognition apparatus 100 divides the speech sequence 311 through a clustering for each section corresponding to a similar feature using a Gaussian mixture model. Through the clustering for each section corresponding to the similar feature, the speech recognition apparatus 100 extracts the feature vector 313 which is more appropriate for applying an acoustic model 323.

The speech recognition apparatus 100 acquires a phone sequence 314 from the feature vector 313 using the acoustic model 323. The phone sequence 314 includes a plurality of phonemes, and a phoneme includes a phone or a sub-phone. The acoustic model 323 includes models such as, for example, a hidden Markov model or a neural network.

In an example, a hidden state 315 indicates a result value or a parameter in the acoustic model 323. The hidden state 315 includes information corresponding to the acoustic model 323. In an example, when the acoustic model 323 is the hidden Markov model, the hidden state 315 includes information on states of a plurality of speech sections or information on transitions between the states of the plurality of speech sections. In an example, when the acoustic model 323 is the neural network, the hidden state 315 includes a result value or a parameter of a hidden layer of the neural network.

The speech recognition apparatus 100 generates a probability sequence 316 from the phone sequence 314 using a language model 325. The language model 325 generates the probability sequence 316 with respect to a linkage relationship between characters corresponding to the phone sequence 314 based on probabilities of characters that may be linked before and after a character. The speech recognition apparatus 100 generates a hidden state 317 of the language model 325 in a process of generating the probability sequence 316.

In an example, the hidden state 317 indicates a result value or a parameter in the language model 316. The hidden state 317 includes information corresponding to the language model 316. The parameter includes, for example, a parameter in an n-gram model, a result value, or a parameter of a hidden layer of the neural network.

In decoding operation 327, the speech recognition apparatus 100 calculates probabilities from all the probability sequence 316 and selects the probability sequence having the highest probability 316. In an example, the speech recognition apparatus 100 acquires the first text 318 from the probability sequence 316.

In evaluation operation 341, the speech recognition apparatus 100 determines whether to perform the second recognition process 340 based on the accuracy 319. In an example, the speech recognition apparatus 100 expresses the accuracy 319 as a score, and compares the accuracy 319 to a threshold. When the accuracy 319 is greater than or equal to the threshold, the speech recognition apparatus 100 determines a first text 333 as a final result. The first text 333 may be the same as the first text 318. As such, when an accuracy of a first text satisfies a threshold, the first text is output as a final result.

When the accuracy 319 is less than the threshold, the speech recognition apparatus 100 performs the second recognition process 340. When the accuracy 319 is less than the threshold, the speech recognition apparatus 100 sends a driving signal 331 to a processor to instruct the process to perform encoding operation 343.

In the second recognition process 340, the speech recognition apparatus 100 corrects the first text 318 based on the parameter generated in the first recognition process 320. In the encoding operation 343, the speech recognition apparatus 100 encodes the first text 318 based on the parameter, such as, for example, the feature vector 313, the hidden state 315, the hidden state 317, or the accuracy 319. The parameter may also include other parameters generated in the first recognition process 320.

In the first recognition process 320, the speech sequence 311, the phone sequence 314, the probability sequence 316, and the first text 318 may be time-series sequences. Thus, each parameter is temporally matched to the first text 318. When a character configuring the first text 318 corresponds to a speech spoken at a time $t_0$, a feature vector or a hidden state corresponding to the time $t_0$ may be present.

In the encoding operation 343, the speech recognition apparatus 100 encodes the time-series first text 318 and a parameter corresponding to the time-series first text 318 and generates a context 335 in which a temporal dimension is condensed. The context 335 may be a vector.

The speech recognition apparatus 100 uses a neural network. The speech recognition apparatus 100 sequentially inputs characters included in the first text 318 and parameters corresponding to the characters to an input layer of the neural network and acquires the context 335 from an output layer.

In the decoding operation 345, the speech recognition apparatus 100 analyzes the context 335 and acquires a second text 337. In an example, the speech recognition apparatus 100 uses a neural network for the decoding operation 345. The speech recognition apparatus 100 inputs the context 335 to an input layer of the neural network, acquires a result from an output layer, and inputs the result and the context 335 back to the input layer. The speech recognition apparatus 100 acquires a second text having an increased accuracy by repeating a process of re-inputting a previous input and a result.

Figure 4:
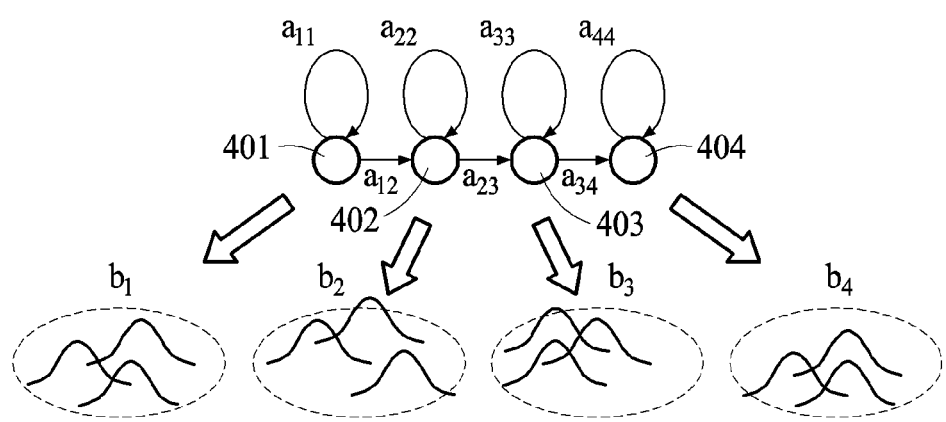
FIG. 4 illustrates an example of a hidden Markov model (HMM) to be applied to a speech recognition apparatus.

FIG. 4 illustrates an example of a hidden Markov model to be applied to a speech recognition apparatus.

The speech recognition apparatus 100 extracts a feature vector from a speech sequence. In an example, the speech recognition apparatus 100 uses the hidden Markov model to acquire the speech sequence from the feature vector.

The speech recognition apparatus 100 divides the speech sequence into a plurality of speech sections. In an example, the speech sequence may be divided into speech sections, each having a similar feature. The speech recognition apparatus 100 uses, for example, a Gaussian mixture model to divide the speech sequence into the plurality of speech sections.

The hidden Markov model includes states corresponding to the plurality of speech sections. Referring to FIG. 4, the hidden Markov model includes a state 401, a state 402, a state 403, and a state 404. The hidden Markov model includes statistical information on a speech section. The statistical information includes a probability distribution.

The speech recognition apparatus 100 calculates an observation probability distribution for each of the states. The observation probability distribution may indicate a probability distribution corresponding to a pattern of a feature of a speech section for each state among statistical information on a speech section. The states 401, 402, 403, and 404 correspond to observation probability distributions b1, b2, b3 and b4, respectively.

The speech recognition apparatus 100 calculates a probability of transition between the states. In FIG. 4, a11 denotes a probability of transition from the state 401 to the state 401, and a12 denotes a probability of transition from the state 401 to the state 402. The speech recognition apparatus 100 calculates probabilities a11, a22, a33, a44, a12, a23 and a34 of transitions between the states 401, 402, 403, and 404.

The speech recognition apparatus 100 acquires a phone sequence based on the statistical information on the states of the plurality of speech sections configuring the speech sequence and statistical information on the transitions between the states of the plurality of speech sections. The statistical information on the states of the speech sections may indicate the observation probability distributions and the statistical information on the transitions between the states may indicates the probabilities of transitions between the states. The speech recognition apparatus 100 determines an optical state sequence corresponding to the feature vector of the speech sequence based on the observation probability distributions and the probabilities of transitions. The speech recognition apparatus 100 decodes the determined state sequence and acquires the phone sequence.

Figure 5:
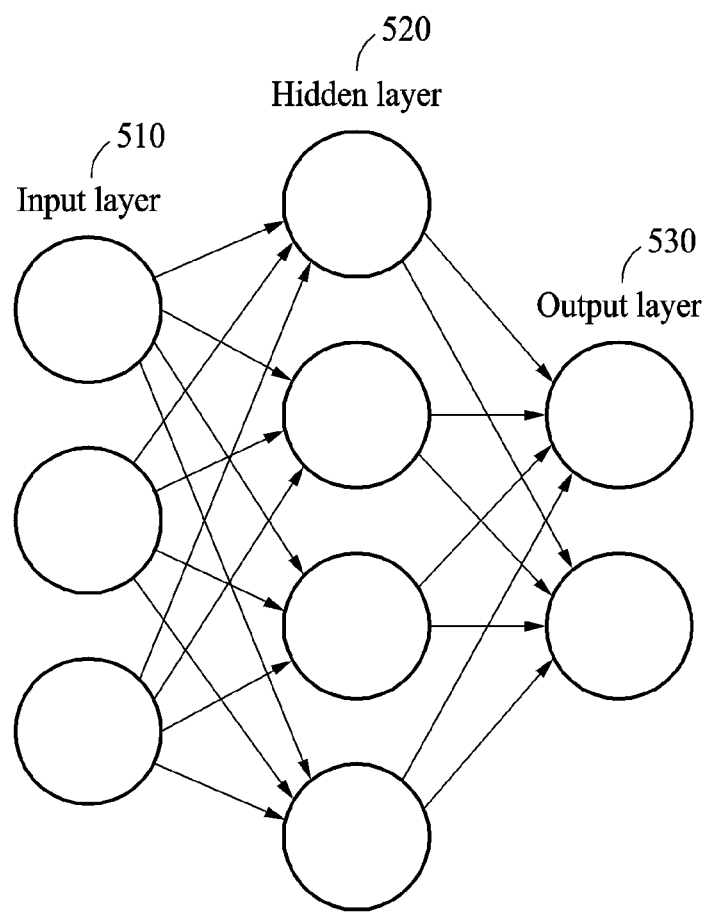
FIG. 5 illustrates an example of a neural network to be applied to a speech recognition apparatus.

FIG. 5 illustrates an example of a neural network to be applied to a speech recognition apparatus.

Referring to FIG. 5, a neural network to be applied to the speech recognition apparatus 100 includes an input layer 510, a hidden layer 520, and an output layer 530. Each of the input layer 510, the hidden layer 520, and the output layer 530 includes a plurality of neurons.

The input layer 510 indicates a layer to which input data is input. The input data may vary based on an operation in which a neural network is used. When the neural network is applied to an acoustic mode, the input data includes a speech sequence or a feature vector. When the neural network is applied to a language model, the input data includes a phone sequence. When the neural network is applied to a second recognition process, the input data includes a first text and a parameter generated in a first recognition process.

The hidden layer 520 includes a plurality of layers. A node included in each of the layers is connected to at least one node included in a subsequent layer by a connection line. A node and a connection line may each have a unique state value and a unique attribute value. A state value of the connection line is referred to as a weight. The state value may vary based on input data, whereas the attribute value does not change.

Data input through the connection line from a node connected to a front end of the connection line updates a state value of a node connected to a rear end of the connection line, and affects a node adjacent to the node connected to the rear end of the connection line. The input data is processed in the corresponding node such that new data is acquired. As such, the input data is processed in each node while updating state values of a node and a connection line along the connection line of each layer. Thus, the input data reaches an output layer 530.

The speech recognition apparatus 100 generates result data based on the state value of the node included in the output layer 530 and data obtained through a processing performed in the output layer 530. The result data may vary based on an operation in which a neural network is used. When the neural network is applied to an acoustic model, the result data includes a phone sequence. When the neural network is applied to a language model, the result data includes a probability sequence. When the neural network is applied to the second recognition process, the result data includes the second text.

The speech recognition apparatus 100 uses a learned neural network. A parameter or a weight included in the neural network is learned based on learning data. When the neural network is applied to an acoustic model, a speech sequence is used as the learning data, and the parameter or the weight included in the neural network is adjusted until an accurate phone sequence is obtained. The weight included in the neural network may be preprocessed through an unsupervised learning instead of being arbitrarily initialized.

Figure 6:
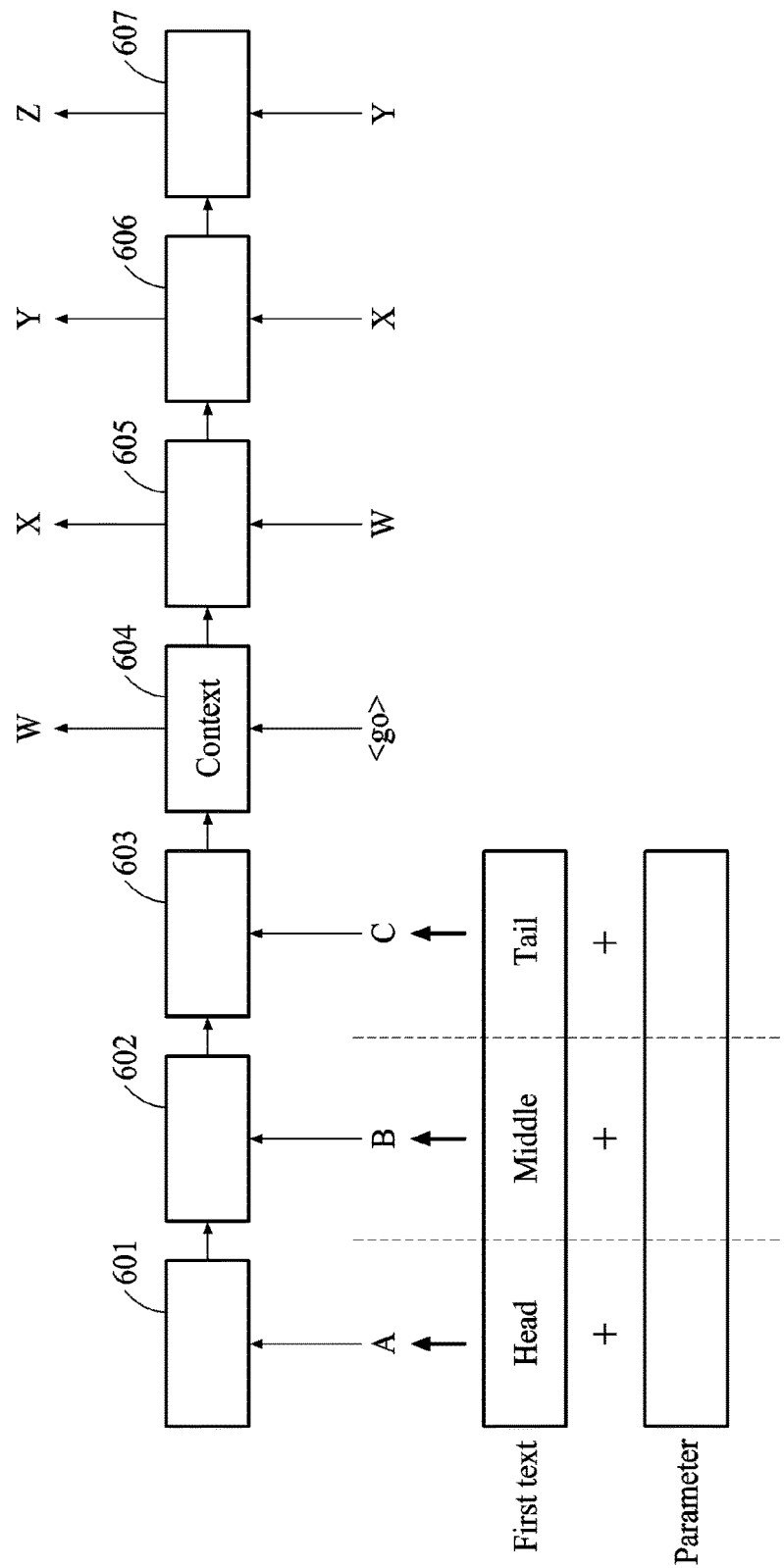
FIG. 6 illustrates an example of a neural network to be applied to a speech recognition process.

FIG. 6 illustrates an example of a neural network to be applied to a second recognition process.

In the second recognition process, using a neural network, the speech recognition apparatus 100 acquires a second text from a first text based on an accuracy, a hidden state, or a feature vector generated in a first recognition process without distinguishing between an acoustic model and a language model.

In an example, the speech recognition apparatus 100 uses a recurrent neural network. In an example, an encoding operation is performed time-sequentially. In an example, a context includes time-sequentially compressed information. In an example, the first text is classified into a head portion, a middle portion, and a tail portion. In operation 601, the speech recognition apparatus 100 inputs an input A including the head portion of the first text and a parameter corresponding to the head portion to an input layer. In operation 602, the speech recognition apparatus 100 inputs an input B including the middle portion of the first text, a parameter corresponding to the middle portion, and a result of operation 601 to the input layer. In operation 603, the speech recognition apparatus 100 inputs an input C including the tail portion of the first text, a parameter corresponding to the tail portion, and a result of operation 602 to the input layer. In this example, the input A, the input B, and the input C may be inputs having the same attribute.

The speech recognition apparatus 100 decodes the context using the neural network. As a result of the decoding, the second text is generated. Referring to FIG. 6, a decoding operation includes operations 604, 605, 606, and 607.

The speech recognition apparatus 100 initiates the decoding operation in response to a driving signal. In FIG. 6, <go> denotes the driving signal. In operation 604, the speech recognition apparatus 100 inputs the context to the input layer of the neural network and acquires a result w. In operation 605, the speech recognition apparatus 100 inputs the context and the result w to the input layer and acquires a result x and a context reflecting the result w. In operation 606, the speech recognition apparatus 100 inputs the result x and the context reflecting the result w to the input layer and acquires a result y and a context reflecting the result w and the result x. In operation 607, the speech recognition apparatus 100 inputs the result y and the context reflecting the result w and the result x to the input layer and acquires a result z and a context reflecting the result w, the result x, and the result y.

The speech recognition apparatus 100 generates the second text by combining the result w, the result x, the result y, and the result z. For example, each of the result w, the result x, the result y, and the result z may correspond to a word. In another example, each of the result w, the result x, the result y, and the result z may correspond to a probability. The speech recognition apparatus 100 generates the second text by decoding a probability sequence including the result w, the result x, the result y, and the result z. In this example, the decoding differs from operations 604 through 607 and corresponds to the decoding operation 327 of FIG. 3.

As such, the speech recognition apparatus 100 acquires the second text having increased accuracy by repeating a process of re-inputting a result obtained from the output layer and a previous input to the input layer.

The speech recognition apparatus 100, and other apparatuses, units, modules, devices, and other components described herein with respect to FIGS. 1-8 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. For example, a processor may include multiple processors or a processor and a controller. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method for speech recognition, the method comprising:
    performing a first speech recognition for a speech sequence by generating a first text from the speech sequence using an acoustic model and a language model;
    determining whether an accuracy of the first text meets a threshold; and
    performing a second speech recognition for the speech sequence by generating a second text from the first text using a neural network based on a parameter generated in the generating of the first text, in response to the accuracy of the first text being determined to fail to meet the threshold, wherein the neural network is different from the acoustic model and the language model.

2. The method of claim 1, further comprising:
    outputting the first text in response to the accuracy of the first text being determined to meet the threshold.

3. The method of claim 1, wherein the parameter comprises a feature vector extracted from the speech sequence, a hidden state of the acoustic model corresponding to the speech sequence, a hidden state of the language model corresponding to the speech sequence, or the speech sequence.

4. The method of claim 1, wherein the determining comprises:
    calculating the accuracy of the first text based on the parameter; and
    comparing the accuracy to the threshold.

5. The method of claim 1, wherein, for the performing of the second speech recognition, the generating of the second text comprises:
    encoding the first text based on the parameter to generate a context; and
    determining the second text by decoding the context using the neural network.

6. The method of claim 5, wherein the neural network has been trained in advance by considering speech training sequences as learning data.

7. The method of claim 1, wherein, for the performing of the first speech recognition, the generating of the first text further comprises:
    determining a phone sequence from the speech sequence using the acoustic model;
    determining a probability sequence from the speech sequence using the language model; and
    generating the first text based on the probability sequence.

8. The method of claim 7, wherein the generating of the first text further comprises extracting a feature vector from the speech sequence, and
    the determining of the phone sequence comprises determining a phone sequence from the feature vector using the acoustic model.

9. The method of claim 7, wherein, for the performing of the first speech recognition, the determining of the phone sequence comprises determining the phone sequence based on statistical information associated with states of speech sections comprising the speech sequence and statistical information associated with transitions between the states of the speech sections.

10. The method of claim 7, wherein the acoustic model comprises another neural network on which a prior learning is performed based on learning data.

11. The method of claim 9, wherein the hidden state of the acoustic model comprises information on the states of the speech sections comprising the speech sequence or on transitions between the states of the speech sections.

12. A non-transitory computer-readable storage medium storing instructions that, when executed by a processor, cause the processor to perform the method of claim 1.

13. A processor-implemented method for speech recognition, the method comprising:
    performing a first recognition for a speech sequence by generating a first text from the speech sequence using an acoustic model and a language model;
    determining whether to perform a second recognition for the speech sequence, based on a result of the performing of the first recognition; and
    selectively, dependent on a result of the determining, performing the second recognition by generating a second text from the first text using a neural network based on a parameter generated in the generating of the first text, wherein the neural network is different from the acoustic model and the language model.

14. The method of claim 13, wherein the parameter comprises a feature vector extracted from the speech sequence, a hidden state of the acoustic model corresponding to the speech sequence, a hidden state of the language model corresponding to the speech sequence, or the speech sequence.

15. A speech recognition apparatus comprising:
    a processor configured to:
    perform a first speech recognition for a speech sequence by generating a first text from the speech sequence using an acoustic model and a language model;
    determine whether an accuracy of the first text meets a threshold;
    perform a second speech recognition for the speech sequence by generating a second text from the first text using a neural network based on a parameter generated in the generating of the first text, in response to the accuracy of the first text being determined to fail to meet the threshold, wherein the neural network is different from the acoustic model and the language model; and
    indicate results of the performing of the first recognition and the second recognition.

16. A speech recognition apparatus comprising:
    a sensor configured to receive a speech sequence; and
    a processor configured to:
    extract a feature vector from the speech sequence;

determine a phone sequence and a hidden value of an acoustic model from the feature vector using the acoustic model;

generate a probability sequence and a hidden value of a language model from the phone sequence using the language model;

generate a first text based on the probability sequence;

output the first text, in response to an accuracy of the first text being determined to be greater than or equal to a threshold;

encode the first text to generate a context, in response to an accuracy of the first text being determined to be less than the threshold; and decode the context to output a second text being generated using a neural network, the neural network being different from the acoustic model and the language model.

17. The speech recognition apparatus of claim 16, wherein the processor is further configured to encode the first text based on any one or any combination of the feature vector, the phone sequence, the hidden value of the acoustic model, the probability sequence, the hidden value of the language model, and the accuracy.

18. The speech recognition apparatus of claim 16, wherein the processor is further configured to extract the feature vector based on:

dividing the speech sequence at intervals of frames to acquire information per frequency band from each of the frames; and digitizing the information per frequency band for each of the frames to extract the feature vector.

19. The speech recognition apparatus of claim 16, further comprising a memory configured to store instructions to be executed by the processor, to store the first text and the second text, to store parameter generated in the generating of the first text and the second text, and to store information on the acoustic model, the language model, and the neural network.

20. The method of claim 1, wherein, for the performing of the second speech recognition, the generating of the second text from the first text using the neural network further comprises repeating a process of re-inputting a result obtained from an output layer of the neural network and a previous input to an input layer of the neural network, wherein the performing of the second speech recognition is without using the acoustic model and the language model being used in the performing of the first speech recognition.

* * * * *